US006667384B2

(12) United States Patent
Gu et al.

(10) Patent No.: US 6,667,384 B2
(45) Date of Patent: Dec. 23, 2003

(54) METHYL ACRYLATE-DIAMINE BASED POLYAMIDE RESINS AND PROCESSES FOR PRODUCING THE SAME

(75) Inventors: Qu-Ming Gu, Hockessin, DE (US); Armin Michel, DE Amersfoort (NL); Huai Nan Cheng, Wilmington, DE (US); William W. Maslanka, Landenberg, PA (US); Ronald R. Staib, Wilmington, DE (US)

(73) Assignee: Hercules Incorporated, Wilmington, DE (US)

( * ) Notice: Subject to any disclaimer, the term of this patent is extended or adjusted under 35 U.S.C. 154(b) by 0 days.

(21) Appl. No.: 10/032,651

(22) Filed: Dec. 27, 2001

(65) Prior Publication Data

US 2003/0153722 A1 Aug. 14, 2003

(51) Int. Cl.[7] .................. C08G 73/00; C08G 69/48; C08L 77/00; C08L 33/00
(52) U.S. Cl. .............. 528/342; 528/310; 528/322; 528/332; 524/606; 524/608; 525/430; 525/435; 525/436; 162/157.6; 162/158; 162/164.1; 162/164.6; 162/167; 162/168.2; 162/183; 162/185; 162/202
(58) Field of Search .................. 528/342, 310, 528/322, 332; 524/606, 608; 525/430, 435, 436; 162/167, 168, 164.6, 183, 185, 202, 164.1, 157.6, 158

(56) References Cited

U.S. PATENT DOCUMENTS

| 3,114,380 | A | | 12/1963 | Allen |
|---|---|---|---|---|
| 3,159,612 | A | | 12/1964 | Tsou |
| 3,305,493 | A | | 2/1967 | Emmons |
| 3,445,441 | A | | 5/1969 | Rushton |
| 3,509,047 | A | | 4/1970 | Rushton |
| 3,514,250 | A | | 5/1970 | Rushton |
| 3,528,928 | A | | 9/1970 | Rushton |
| 3,630,659 | A | | 12/1971 | Hendricks et al. |
| 3,728,215 | A | | 4/1973 | Espy |
| 3,892,527 | A | | 7/1975 | Tamer et al. |
| 4,929,661 | A | | 5/1990 | Noomen et al |
| 5,125,929 | A | | 6/1992 | Amey |
| 5,331,100 | A | | 7/1994 | Smith et al. |
| 5,338,807 | A | * | 8/1994 | Espy et al. .............. 525/430 |
| 5,641,855 | A | | 6/1997 | Scherr et al. |
| 6,103,861 | A | * | 8/2000 | Staib et al. ............. 528/322 |
| 6,133,405 | A | * | 10/2000 | Allen ..................... 528/310 |
| 6,222,006 | B1 | * | 4/2001 | Kokko et al. ........... 528/332 |
| 6,352,613 | B1 | * | 3/2002 | Maslanka ............... 162/111 |

FOREIGN PATENT DOCUMENTS

| DE | 2210972 | | 4/1973 |
|---|---|---|---|
| EP | 0 322 560 | | 7/1989 |
| EP | 0505 031 A2 | * | 9/1992 |
| GB | 1051579 | | 12/1966 |
| GB | 1145235 | | 3/1969 |
| IT | 868717 | | 7/1970 |
| JP | 06322263 A | * | 11/1994 |
| JP | 2000/063794 | | 2/2000 |
| WO | WO 99/09252 | | 2/1999 |

OTHER PUBLICATIONS

Espy, H.; The Mechanism of Wet–Strength Development in Paper: A Review, Tappi, J., vol. 78 No. 4 pp. 90–99 (Apr. 1995).

* cited by examiner

*Primary Examiner*—P. Hampton Hightower
(74) *Attorney, Agent, or Firm*—Joanne Rossi

(57) ABSTRACT

The present invention contemplates poly(aminoamide) pre-polymers, polyamide polymers, a multi-step process for the synthesis of these pre-polymers and polymers using acrylates and at least one monomer containing at least two primary amines, and the resins resulting from the reaction of the polymers with an epihalohydrin. These resins may be used as wet strength resins and creping aids in the paper-making industry as well as surface additives for wool.

42 Claims, No Drawings

METHYL ACRYLATE-DIAMINE BASED POLYAMIDE RESINS AND PROCESSES FOR PRODUCING THE SAME

TECHNICAL FIELD AND INDUSTRIAL APPLICABILITY OF INVENTION

The present invention relates to polyamide pre-polymers, polyamide polymers, a process for producing polyamide pre-polymers and polyamide polymers, and the resins resulting from reacting a polyamide polymer with an epihalohydrin. The resins of the present invention may be used as wet strength resins and/or creping aids in the papermaking industry as well as surface additives for wool.

BACKGROUND OF THE INVENTION

In the paper industry, poly(aminoamides) made from adipate and diethylenetriamine (DETA) are commonly used as pre-polymers for the preparation of polyamide polymers, and ultimately, wet strength resins (e.g. H. H. Espy, *TAPPI J.*, 78, 90 (1995)). Typically, to result in a resin, a polyamide polymer is treated with epichlorohydrin, which reacts with the secondary amine on the polyamide polymer backbone to form azetidinium, chlorohydrin, epoxide or other functionalities necessary for self-crosslinking and reacting with the pulp fiber. Despite the use of this polymer, other poly (aminoamides) with novel structures are still being sought.

U.S. Pat. No. 3,159,612 (Tsou et al. '612), U.S. Pat. No. 3,305,493 (Emmons), and British Patent 1,051,579 (Tsou et al. '579) describe the synthesis of alternative polyamide polymers; however, each teaches a process where different polymer structures and different molecular weights than those contemplated by the present invention are obtained. More particularly, Tsou et al. use a one-step reaction process, involving a diamine and an acrylic or methacrylic ester. Emmons describes a process having "two steps", however both reactants (a diamine and an acrylic or methacrylic ester in a 1:1 molar ratio) are added all at once. Thus, except possibly with respect to the reaction temperature (in the case of acrylic ester), the "two steps" are actually identical and are therefore, in reality, only one step. In fact, Emmons indicates that the "two steps" may occur concurrently or simultaneously.

Several problems exist in the prior art that are addressed by the present invention. More specifically, the prior art processes generate polymers having random placement of monomer residues and have less flexibility in polyamide structure design and property optimization. Still further, the polymers made according to the prior art have low molecular weights, which results in sub-optimal levels of wet strength.

SUMMARY OF THE INVENTION

The present invention contemplates polyamide pre-polymers, polyamide polymers, a multi-step process for the synthesis of polyamide pre-polymers and polyamide polymers using acrylates and at least one monomer containing at least two primary amines (hereinafter referred to as "diamine"), and resins resulting from reacting a polyamide polymer of the present invention with an epihalohydrin.

The present invention relates to a process comprising the steps of: (a) the Michael addition of a first diamine to an acrylate, thereby forming a reaction mixture containing an amine-containing diester or diacid intermediate pre-polymer reaction product; and (b) carrying out aminolysis and polymerization using either of two methods, Method (b1) or Method (b2). Method (b1) comprises adding a second diamine to the reaction mixture and heating the reaction mixture to an elevated temperature for a period of time ranging from about 2 hours to about 8 hours. Method (b2) adds a second diamine to the reaction mixture and introduces an enzyme, acting as a catalyst, into the reaction mixture, which is then heated to an elevated temperature. Preferably, the enzyme introduced into Method (b2) in the polymerization reaction is a hydrolase enzyme, wherein about 0.1% to about 10% by weight of the enzyme, relative to the total weight of the monomers (diamine and acrylate), is used. The final reaction product resulting from a process of the present invention may be either a linear or a branched condensation polymer having a molecular weight ranging from about 1490 to about 200,000 daltons and a polydispersity ($M_w/M_n$) ranging from about 2.0 to about 10.0.

A method for making a polyamide resin comprising the steps of (i) reacting the final reaction product, a polyamide polymer, with an epihalohydrin, and (ii) allowing the reaction to proceed where the final reaction product is cross-linked with itself.

An object of the present invention is to synthesize and develop regio-regular polyamide structures that contain a high proportion of secondary amine groups to carbons on the polymer repeat units, and have a high molecular weight, as well as provide a process for the synthesis of those polyamide polymers, polyamide pre-polymers, and ultimately resins that were reacted with a halohydrin.

DETAILED DESCRIPTION OF A PREFERRED EMBODIMENT OF THE INVENTION

The present invention contemplates polyamide pre-polymers, polyamide polymers, a multi-step process for the synthesis of polyamide polymers as well as polyamide pre-polymers using acrylates and at least one monomer containing at least two primary amines, and resins resulting from reacting a polyamide polymer of the present invention with an epihalohydrin.

There are several distinct advantages conferred by the present invention. First, the development of a multi-step process allows for the production of more general polyamide structures than is currently found in the art, thereby providing greater flexibility in structure design and property optimization such that there is a wider range of possible polymer structures. Second, the optional use of different diamines in steps (a) and (b) further provides for greater flexibility in polyamide structure design and property optimization. However, even when the same diamine is used in both reaction steps (a) and (b), the present invention differs from the prior art. For example, according to the prior art, when the diamine is $NH_2-C_nH_{2n}-(NH-C_nH_{2n})_x-NH_2$ and R is a C2–C6 alkylene moiety, the polymer repeat unit is:

where $0 \leq x \leq 6$, and $2 \leq n \leq 10$. For easier visualization, W has been denoted as $[NH-C_nH_{2n}-(NH-C_nH_{2n})_x-NH]$. Thus the same repeat unit is:

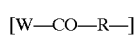

However, when the process of the present invention utilizes the above-noted starting materials, a different polymer repeat sequence is obtained, for example:

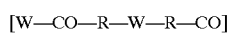

A third advantage of the present invention is that typical polymers in the art are generated having a random placement of monomer residues, whereas the process of the present invention generates polyamide polymers having discrete and regio-regular polymer structures. These regio-regular and discrete polymers are advantageous because they allow structures to be designed with greater specificity, and therefore, increase the likelihood of greater numbers of the polymers having a particular functionality. The fourth advantage of the present invention is that the polyamide polymers synthesized according to typical methods known in the art (e.g., Emmons) have low molecular weights (about 300 to 1000 Daltons) whereas the polyamide polymers of the present invention have higher molecular weights (at least 1490 Daltons, but usually much higher), which provide improved wet strength.

Note that in comparison to conventional adipic acid-DETA polymers (e.g., Espy, 1995), the present invention provides polyamide polymers having at least one additional secondary amine per repeating unit when using the same diamine as the starting materials thereby enabling the polymer to react with an epihalohydrin and allowing for crosslinking of the polymer. The polyamide pre-polymers according to the present invention, such as those made using methyl acrylate and diethylene triamine (DETA) or dipropylene triamine (DPTA), have one secondary amine for about every 3–5 carbons, whereas in the backbone of a conventional adipate/DETA pre-polymer, synthesized by the polymerization of adipic acid and DETA, there is only 1 secondary amine for every 10 carbons on the polymer repeat units. The level of functionality on the backbone of a resin is, to some extent, determinative of the efficiency of the resin as a wet strength agent, and since the self-crosslinking and reactions with the pulp fiber each contribute to wet strength properties, a higher proportion of these functionalities on a resin may produce a more efficient resin because there is a high proportion of free secondary amines in the polymer backbone that can react with an epihalohydrin to afford high levels of azetidinium and/or epoxide functionalities. Thus, it is desirable to have a higher proportion of the secondary amine on the backbone of a polyamide pre-polymer because this proportion relates to the end-use properties of the resin.

The term "regio-regular", as used herein, refers to the well-defined repeat placement of the monomer residues to form a polymer structure. It is in contradistinction to "random" placement, which denotes the co-existence of various compositions and/or structures.

The present invention contemplates a synthesis process having at least two chemically distinct steps for the synthesis of polyamide pre-polymers and polyamide polymers wherein the process comprises the steps of: (a) adding a first diamine to an acrylate thereby forming a reaction mixture, wherein the diamine and acrylate are in a ratio of approximately 1:2 respectively, and resulting in an amine-containing diester or diacid intermediate pre-polymer reaction product; and (b) adding a second diamine to the reaction product of step (a) and allowing the polymerization to proceed to completion, thereby forming a final reaction product. Steps (a) and (b) may be performed separately or in situ, with or without the purification of the diester or diacid intermediate reaction pre-polymer. The synthesis process is typically performed neat, however, it may also utilize an organic solvent or aqueous solution comprising up to about 30% water.

Step (a) is the Michael addition of a first diamine to an acrylate to form an amine-containing diester or diacid, wherein the mole ratio is about 1:2, respectively.

Further, the sequence of the addition of the first diamine to the acrylate and the stoichiometry of these reactants is critical. Preferably, the Michael addition (Step (a)) is performed by gradually adding, over about 20–60 minutes, 2 moles of an acrylate to 1 mole of a first diamine at room temperature, for example about 20° C. to about 30° C., in the absence of a solvent, or in the presence of either alcohol or water. The addition of water to the reaction mixture enhances the rate of the Michael addition. However, in step (a), the concurrent addition of the acrylate and the first diamine is acceptable, and in fact preferred, when a water-containing diamine is used during the Michael addition reaction.

In a general and representative sense, the resultant product of step (a) is an intermediate pre-polymer reaction product, also contemplated by the present invention, having the formula:

wherein $R^1$ is selected from the group consisting of substituted C1–C6 alkyl group, unsubstituted C1–C6 alkyl group, and hydrogen; $R^2$ is selected from the group consisting of H and C1–C2 alkyl group; X is selected from the group consisting of O, NH, S, $CH_3N$—, alkyl (C1–C6) and aryl; n ranges from 1–10; and m ranges from 1–6. More preferably, $R^1$ is a methyl group and $R^2$ is hydrogen.

For example, the reaction of DETA and methyl acrylate gives the following product:

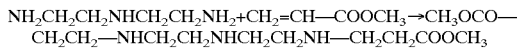

Step (a) is an exothermic reaction, and therefore, the reaction vessel should be cooled through any suitable means known in the art. Preferably, the reaction temperature for Step (a) is in the range of about 10° C. to about 60° C., more preferably about 15° C. to about 40° C., and most preferably about 20° C. to about 30° C.

Step (b) of the present invention, comprising aminolysis and polymerization, may be carried out using either of two methods, Method (b1) or Method (b2). In Methods (b1) and (b2), the second diamine may be either the same diamine or a different diamine than was used in Step (a). For example, the reaction of the DETA-acrylate diester with N-methyl-bis(aminopropyl)amine (MBAPA) would give the following product:

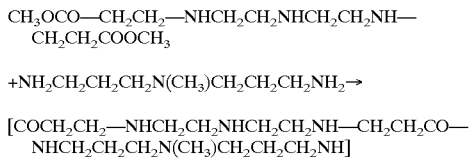

Method (b1) comprises adding a second diamine, in approximately the same molar amount as the first diamine used in step (a), to the reaction mixture of step (a) and heating this reaction mixture to an elevated temperature in the range of about 70° C. to about 140° C., preferably to a temperature of about 130° C., for a period of time ranging from about 2 hours to about 8 hours. This reaction time is partially determinative of the molecular weight of the final reaction product, wherein a longer reaction time generally corresponds to a higher molecular weight. The reaction time can be adjusted to provide a final reaction product having the appropriate molecular weight for the desired application. The progress of polymerization can be assessed monitoring the viscosity increase of the aqueous solution. Typically, at the beginning of the reaction, the product has no viscosity at all, but as the polymerization reaction proceeds, the viscosity increases. A sample can be withdrawn from the reaction mixture, wherein the viscosity of the aqueous solution can be determined, such that the higher the viscosity, the higher the molecular weight of the polyamide that was produced.

Method (b2) comprises adding a second diamine, in approximately the same molar amount as the first diamine used in step (a), to the reaction mixture of step (a) and introducing an enzyme, acting as a catalyst, into the reaction mixture which is then heated to an elevated temperature ranging from about 60° C. to about 80° C. for a period of time ranging from about 2 hours to about 16 hours. Preferably, the enzyme introduced into Method (b2) in the polymerization reaction is a hydrolase enzyme, more preferably any lipase or protease selected from the group consisting of plants, bacteria, fungi and yeast. Still more preferably, the enzyme is a lipase selected from the group consisting of yeast *Candida antarctica* and *Mucor miehei*, most preferably the lipase is yeast *Candida antarctica*. Preferably, about 0.1% to about 10% by weight of the enzyme, relative to the total weight of the monomers (diamine and alkyl acrylate), is used. More preferably, about 0.5% to about 5%, and most preferably about 1% to about 3% by weight of the enzyme, relative to the total weight of the monomers (diamine and acrylate), is used. The enzyme functions as a catalyst to activate the carbonyl group of the diester or diacid and to facilitate the nucleophilic attack by the amino group of the diamine, thereby enhancing the reaction rate of polyamide condensation. Generally, the amount of enzyme introduced into the reaction mixture corresponds to the desired molecular weight of the polymer, wherein a low amount of enzyme results in a slow reaction, thereby producing a low molecular weight polymer. Conversely, a higher amount of enzyme introduced into the reaction mixture results in a polymer having a higher molecular weight. For example, in the preferred embodiment, use of about 1% by weight of the enzyme, relative to the total weight of the monomers (diamine and acrylate) may correlate to a molecular weight in the range of about 2000–4000, whereas use of about 3% by weight of the enzyme, relative to the total weight of the monomers (diamine and acrylate) may correlate to a molecular weight of about 7000 to 240,000.

Examples of suitable acrylates contemplated by this invention include, but are not limited to, alkyl acrylates, alkyl methacrylates, aryl acrylate, aryl methacrylates, methyl, ethyl, propyl, isopropyl, butyl, isobutyl, tert-butyl, phenyl, and benzyl esters of acrylic acid, methacrylic acid, ethacrylic acid, and butacrylic acid and combinations thereof. The preferred acrylates are methyl acrylate (MA), ethyl acrylate, methyl methacrylate (MMA), and ethyl methacrylate and combinations thereof. The most preferred acrylates are methyl acrylate (MA) and methyl methacrylate (MMA) and combinations thereof.

Examples of suitable diamines contemplated by the present invention include, but are not limited to, diethylene triamine (DETA) or its analogs, N-(3-aminopropyl)-1,3-propanediamine (dipropylene triamine or DPTA), ethylene diamine (EDA), 1,6-hexamethylenediamine (HMDA), triethylene tetraamine (TETA), tetraethylene pentaamine (TEPA), N-methyl-bis(aminopropyl)amine (MBAPA), bis(hexamethylene triamine) (BHMT), tripropylene tetraamine, tetrapropylene pentaamine, spermine, spermidine, 1-phenyl-2,4-pentane diamine, 2-phenyl-1,3-propanediamine, 2-methyl-1,5-pentane diamine, and phenylene diamine and combinations thereof. The preferred diamines are diethylene triamine (DETA), dipropylene triamine (DPTA), 1,6-hexamethylenediamine (HMDA), triethylene tetraamine (TETA), N-methyl-bis(aminopropyl)amine (MBAPA), and bis(hexamethylene triamine) (BHMT) and combinations thereof. The most preferred diamines are diethylene triamine (DETA), dipropylene triamine (DPTA), 1,6-hexamethylenediamine (HMDA), and N-methyl-bis(aminopropyl)amine (MBAPA) and combinations thereof.

The final reaction product, a polyamide polymer also contemplated by the present invention, resulting from steps (a) and (b) has the formula:

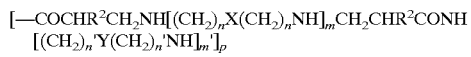

wherein $R^2$ is selected from the group consisting of H and C1–C2 alkyl group; X is selected from the group consisting of O, NH, S, $CH_3N$—, alkyl (C1–C6) and aryl; Y is selected from the group consisting of O, NH, S, $CH_3N$—, alkyl (C1–C6) and aryl; n and n' range from 1–10; m and m' range from 1–6; and p ranges from 1–1000. Preferably, $R^2$ is selected from the group consisting of H and methyl; X is selected from the group consisting of NH and $CH_3N$—; Y is selected from the group consisting of NH and $CH_3N$; n and n' range from 2–3; m and m' are 1; and p ranges from 10–100. More preferably, $R^2$ is H; X is NH; Y is NH; n and n' range from 2–3; m and m' are 1; and p ranges from 20–100.

The final reaction product may be either a linear or a branched condensation polymer having a molecular weight ranging from about 1490 to about 200,000 daltons and a polydispersity ($M_w/M_n$) ranging from about 2.0 to about 10.0. For example, the linear polymer structure from the reaction product of DETA-acrylate diester and MBAPA would be:

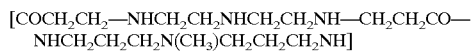

One of the possible branch structures from the same reaction is given as follows:

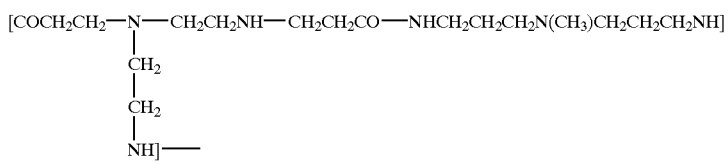

The molecular weight of the final reaction product varies according to the reaction temperature, the specific monomers used for the reaction, the reaction time and the amount of enzyme incorporated into the reaction mixture depending on the particular method utilized in the inventive process. A typical functional polymer of the present invention resulting from the above-described process has an average number molecular weight ($M_n$) of about 3,500 daltons, a molecular weight ($M_w$) ranging from about 9,000 to about 14,000 daltons, a polydispersity ($M_w/M_n$) ranging from about 3 to about 6 and is generally a semi-solid material having a light color.

The present invention further contemplates reacting the final reaction product with an epihalohydrin, preferably epichlorohydrin, thereby resulting in a polyamide resin, wherein the polymer has the ability to cross-link with itself or to react with other materials, such as paper, pulp, wool, wood and the like. A method for making a polyamide resin comprises the steps of (i) reacting the final reaction product, a polyamide polymer, with an epihalohydrin, and (ii) allowing the reaction to proceed where the final reaction product is cross-linked with itself. When the polymers of the present invention are treated with epichlorohydrin under the appropriate reaction conditions (i.e., those conditions shown in Examples 8 and 9 are preferred), the resulting resins are water-soluble, cationic resins. Manipulation of temperatures aid in determining the functionality of the resin, for example, in reacting the final reaction product with an epihalohydrin, it may occur at a temperature up to 70° C., wherein the temperature may remain constant throughout the reaction or it may be multi-staged such that a low temperature is used initially and subsequently utilizes an elevated temperature. Furthermore the pH of this reaction must be basic, wherein the initial pH may be 9.0 or higher, in order to have the non-protonated $2^{nd}$ amines available to the alkylation reaction. Nevertheless, no pH control is necessary during the reaction since the polyamide solution is initially alkaline. After the reaction, the pH has to be further brought down to acidic conditions using $H_2SO_4$ or HCl to a pH of about 6. These types of resins may be used as wet strength resins and/or creping aids in papermaking processes. The polyamide resin according to the present invention comprises the formula:

[—COCHR$^2$CH$_2$K[(CH$_2$)$_n$X(CH$_2$)$_n$K]$_m$CH$_2$CHR$^2$CONH [(CH$_2$)$_n$'Y(CH$_2$)$_n$'NH]$_{m'}$]$_p$ wherein $R^2$ is selected from the group consisting of H and C1–C2 alkyl group; n and n' range from 1–10; m and m' range from 1–6; p ranges from 1–1000; K is selected from the group consisting of

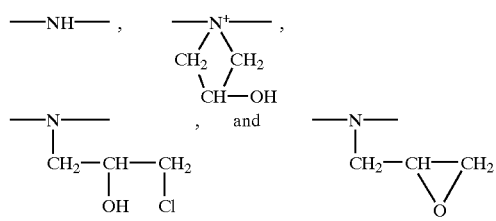

X is selected from the group consisting of O, K, S, Q, alkyl (C1–C6) and aryl; Y is selected from the group consisting of O, K, S, Q, alkyl (C1–C6) and aryl; and Q is selected from the group consisting of

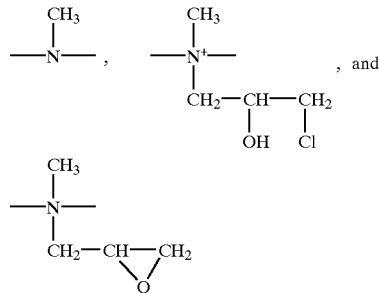

The present invention further contemplates cellulosic products produced using a resin of the present invention in any conventional process typically utilized to produce cellulosic products such as paper towels, napkins, writing paper, and the like.

The embodiments of the present invention are further defined in the following Examples. It should be understood that these Examples are given by way of illustration only. From the above discussion and these Examples, one skilled in the art can ascertain the essential characteristics of this invention, and without departing from the spirit and scope thereof, can make various changes and modifications of the invention to adapt it to various uses and conditions. Thus various modifications of the present invention in addition to those shown and described herein will be apparent to those skilled in the art from the foregoing description. Although the invention has been described with reference to particular means, materials and embodiments, it is to be understood that the invention is not limited to the particulars disclosed, and extends to all equivalents within the scope of the claims.

EXAMPLES

According to the present invention and in the following examples, the molecular weights were determined using size exclusion chromatography (SEC) and the polymer structure was deduced using infrared spectroscopy (IR), $^1$H-nuclear magnetic resonance ($^1$H-NMR), and $^{13}$C-nuclear magnetic resonance ($^{13}$C-NMR).

Example 1

Preparation of a Polyamide Polymer

Methyl acrylate (86.09 g, 1 mol) was gradually added to 52 g of diethylenetriamine (51.68 g, 0.5 mol) at a temperature of 20° C., which was then gradually increased to 40° C., with stirring. The addition took approximately 1 hour, and the reaction mixture was stirred at a temperature of 40° C. to 50° C. for about 60 minutes, wherein the intermediate pre-polymer reaction product was formed. Another portion of diethylenetriamine (51.68 g, 0.5 mol) was added and the reaction mixture was stirred at 90° C. for about 1 hour and stirred further at a temperature of 130° C. to 140° C. for 3 hours. Methanol (which distilled over) was collected, and the product turned into a yellowish, viscous slurry at the end of the reaction. The reaction temperature was lowered to 100° C, and 150 mL of $H_2O$ was added to dissolve the polyamide product. The molecular weight ($M_w$) of the final reaction product, based on SEC analysis, was 8,750 and had a polydispersity ($M_w/M_n$) of 4.15. The structure of the polyamide was characterized by IR and $^{13}$C-NMR spectroscopy. The IR clearly showed the presence of a secondary amide by a strong absorption at 3300 cm−1 (N—H stretch), 1650 cm−1 (O=CNHR stretch band I) and 1560 cm−1 (O=CHNR) stretch band II). $^{13}$C-NMR gave the following resonances: 22.5, 35.9, 39.1, 47.5, 50.1 and 174.6 ppm.

Example 2

Preparation of a Polyamide Polymer

Methyl acrylate (43.05 g, 0.5 mol) was gradually added to diethylenetriamine (25.84 g, 0.25 mol) at a temperature of 20° C., which was then gradually increased to 40° C., with stirring. The addition took approximately 30 minutes, and the reaction mixture was stirred further at 24° C. to 30° C. for about 60 minutes, wherein the intermediate pre-polymer reaction product was formed. Another portion of diethylenetriamine (25.84, 0.25 mol) was added, followed by the addition of 4 grams of immobilized lipase *Candida antarctica*, Novozym 435 from Novo Nordisk). The reaction mixture was stirred at 65° C. for 16 hours. The viscous product was dissolved in 100 mL of methanol at 65° C., and the immobilized enzyme was removed by filtration. The yield was 75 grams. The molecular weight ($M_w$) of the final product, based on SEC analysis, was 8,450 and the polydispersity ($M_w/M_n$) was 2.75.

Example 3

Preparation of a Polyamide Polymer

Methyl acrylate (86.09 g, 1 mol) was gradually added to N-(3-aminopropyl)-1,3-propanediamine (DPTA 65.61 g, 0.5 mol) at 40° C., with stirring. The addition took approximately 60 minutes, and the reaction mixture was stirred further at 60° C. for about 60 minutes, wherein the intermediate pre-polymer reaction product was formed. Another portion of N-(3-aminopropyl)-1,3-propanediamine (DPTA 65.61 g, 0.5 mol) was added and the reaction mixture was stirred at 130° C. to 140° C. for 3 hours. Methanol (which distilled over) was collected. The reaction temperature was lowered to 100° C., and 150 mL of $H_2O$ was added to dissolve the polyamide product. The molecular weight ($M_w$) of the final reaction product, based on SEC analysis, was 15,600 and had a polydispersity ($M_w/M_n$) of 6.90. The structure of the polyamide was characterized by IR and $^{13}$C-NMR spectroscopy. The IR indicated the formation of secondary amide by a strong absorption at 3300 cm−1 (N—H stretch), 1650 cm−1 (O=CNHR stretch band I) and 1560 cm−1 (O=CHNR) stretch band II). $^{13}$C-NMR gave the following resonances: 28.6, 35.9, 37.7, 39.1, 46.6 and 174.8 ppm.

Example 4

Preparation of a Polyamide Polymer

Methyl acrylate (86.09 g, 1 mol) was gradually added to ethylenediamine (30.05 g, 0.5 mol) at 24° C., with stirring. The addition took approximately 20 minutes, and the reaction mixture was heated further with stirring at 50° C. for about 60 minutes, wherein the intermediate pre-polymer reaction product was formed. Diethylenetriamine (51.68 g, 0.5 mol) was added and the reaction mixture was refluxed at 110° C. for 4 hours. Methanol (which distilled over) was collected and the product turned into a yellowish, viscous slurry at the end of the reaction. The reaction temperature was lowered to 80° C., and 100 mL of $H_2O$ were added to dissolve the polyamide product. The molecular weight ($M_w$) of the final reaction product, based on SEC analysis, was 14,500 and had a polydispersity ($M_w/M_n$) of 8.9.

Example 5

Preparation of a Polyamide Polymer

Methyl acrylate (86.09 g, 1 mol) was gradually added to ethylenediamine (30.05 g, 0.5 mol) at 24° C., with stirring. The addition took approximately 20 minutes, and the reaction mixture was stirred at 24° C. for another 4 hours, wherein the intermediate pre-polymer reaction product was formed. More ethylenediamine (30.05 g, 0.5 mol) was added and the reaction mixture was stirred at 70° C. overnight. The product was dissolved in 100 mL of $H_2O$ to give a polyamide solution. The molecular weight ($M_w$) of the final reaction product, based on SEC analysis, was 4,100 and had a polydispersity ($M_w/M_n$) of 2.75.

Example 6

Preparation of a Polyamide Polymer

Methyl acrylate (86.09 g, 1 mol) and 1,6-hexamethylenediamine (58.11 g, 0.5 mol) were added concurrently at 25° C., with stirring. The addition took approximately 60 minutes, and the reaction mixture was stirred at 22° C. for another 60 minutes, wherein the intermediate pre-polymer reaction product was formed. More 1,6-hexamethylenediamine (58.11 g, 0.5 mol) was added and the reaction mixture was kept under reflux at 95° C. for 2 hours. Methanol and water that came off the reaction were collected for 90 minutes at 145° C. The slightly yellowish product was dissolved in 500 mL of $H_2O$ to give a polyamide solution. The molecular weight ($M_w$) of the final reaction product, based on SEC analysis, was 7,100 and had a polydispersity ($M_w/M_n$) of 2.21. The $^{13}$C-NMR characterization of the polyamide gave the following resonances: 26.7, 29.6, 36.1, 39.9, 45.8, 49.2 and 174.4 ppm.

Example 7

Preparation of a Polyamide Polymer

Acrylic acid (189.25 g, 2.6 mol) was gradually added to 1,6-hexamethylenediamine (215.82 g, 1.3 mol) at 25° C., with stirring. The addition took approximately 60 minutes, and the reaction mixture was stirred at 25° C. for about 60 minutes, wherein the intermediate pre-polymer reaction product was formed. More ethylenediamine (78.92 g, 1.3 mol) was added and the reaction mixture was stirred at 135° C. for 30 minutes and at a temperature ranging from 160° C. to 170° C. for 1.5 hours. Water that came off the reaction was collected. The reaction temperature was lowered to 90° C., and 400 mL of $H_2O$ were added to dissolve the polyamide product. The molecular weight ($M_w$) of the final reaction product, based on SEC analysis, was 5,600 and had a polydispersity ($M_w/M_n$) of 2.0.

Example 8

Preparation of a Polyamide Polymer (Utilizing Two Different Diamines)

Methyl acrylate (86.09 g, 1 mol) is gradually added to piperazine (43.1, 0.5 mol) at 24° C., with stirring. The addition takes approximately 20 minutes while the reaction temperature is maintained at 24–40° C., and the reaction mixture is stirred at 60–70° C. for another 6 hours, wherein the intermediate pre-polymer reaction product is formed. Diethylenetriamine (51.6 g, 0.5 mol) is added and the reaction mixture is stirred at 125° C. overnight. The product is dissolved in $H_2O$ to make a polyamide solution at 39%.

The molecular weight ($M_w$) of the final reaction product, based on SEC analysis, is 11,000 and has a polydispersity ($M_w/M_n$) of 4.18.

Example 9

Preparation of a Polyamide Resin

Methyl acrylate/DPTA polyamide (3.75 g, $M_w$: 16,000, $M_w/M_n$: 8.2) was dissolved in 21.25 grams of water. Epichlorohydrin (1.8 g) was added to the polyamide solution within 5 minutes at 24° C., with stirring. After the addition, the mixture was gently stirred at 24° C. for 90 minutes, and the Brookfield viscosity increased 800 cps (30 rpm). To confirm that the resin had been functionalized, the solution was heated to 70° C. As expected, the reaction mixture formed a gel.

Example 10

Preparation of a Polyamide Resin

Methyl acrylate/DPTA polyamide (21.8 g, 87.3 g 25% solution, 0.25 equiv.) was charged to the reaction vessel and diluted to a total weight of 116.3 g. Epichlorohydrin (29.1 g, 0.315 equiv.) was added, followed by warming to a temperature of 33° C. to 35° C. At a Gardner-Holt viscosity "L/M" the resin was diluted with 260 mL of water and the pH adjusted to 3.0 with 9.8 g of concentrated sulfuric acid.

Total solids were about 12% and Brookfield viscosity was about 19 cps.

Example 11

Evaluation of Resin Dry and Wet Tensile Strength

The resin was evaluated in handsheets prepared from 50/50 hardwood/softwood pulp beaten to 500 cc Canadian Standard Freeness at pH 7.5. The percent resin was 0.5% (w/w) based on pulp fiber. Kymene 557H was used as the control. The percent resin is determined by adding resin (solid) based on dry pulp, e.g. at 0.5% add-on to 50 grams of dry pulp in a slurry you would add 0.25 grams of resin on a dry basis.

| Resin | Basis Weight* | % Resin | Dry Tensile (lbs./in.) | Wet Tensile (lbs./in.) |
|---|---|---|---|---|
| Blank | 40 | 0.5 | 15.5 | 0.61 |
| Example 7 | | | 18.4 | 2.77 |
| Kymene 557H | | | 19.6 | 4.2 |

*24" x 36" - 500
Basis Weight - the weight in pounds of a ream of paper usually 500 or 1000 sheets of a specified sixe for a given grade of paper. In the case above the 500 sheets of 24" x 36" paper would weigh 40 lbs.

Basis weight—the weight in pounds, of a ream of paper usually 500 or 1000 sheets of a specified size for a given grade of paper. In the case above the 500 sheets of 24"×36" paper would weigh 40 lbs.

The test procedure for determining the wet and dry tensile is found in TAPPI Method 494. Wet tensile is determined after soaking the test strips in water for 2 hours.

What is claimed is:

1. A method for synthesizing polyamides comprising the steps of:
    (a) adding a first diamine to an acrylate forming a reaction mixture and resulting in an amine-containing intermediate pre-polymer reaction product, wherein the reaction mixture has a mole ratio of 2 moles of acrylate: 1 mole of first diamine; and
    (b) adding a second diamine to the reaction mixture of step (a) and allowing the polymerization to proceed to completion forming a final reaction product, wherein the resultant polyamide has a regio-regular structure.
2. The method according to claim 1, wherein the amine-containing intermediate pre-polymer reaction product is a diester or diacid.
3. The method according to claim 1, wherein step (a) has a reaction temperature of about 10° C. to about 60° C.
4. The method according to claim 1, wherein step (b) further comprises step (b1) heating the reaction mixture for about 2 to about 8 hours at an elevated temperature.
5. The method according to claim 4, wherein the elevated temperature is about 70° C. to about 140° C.
6. The method according to claim 1, wherein step (b) further comprises step (b2) adding an enzyme to the reaction mixture and heating to an elevated temperature.
7. The method according to claim 6, wherein the elevated temperature is about 60° C. to about 80° C.
8. The method according to claim 6, wherein the enzyme is a hydrolase enzyme.
9. The method according to claim 8, wherein the hydrolase enzyme is selected from the group consisting of lipase and protease.
10. The method according to claim 9, wherein the lipase is selected from the group consisting of plant, bacteria, fungi and yeast.
11. The method according to claim 10, wherein the lipase is a yeast lipase.
12. The method according to claim 8, wherein the hydrolase enzyme is about 0.1% to about 10% of a total weight of the first diamine and the acrylate.
13. The method according to claim 1, wherein the first diamine molecule and the acrylate are added sequentially.
14. The method according to claim 1, wherein the first diamine and the acrylate are added concurrently.
15. The method according to claim 1, wherein the second diamine is the same as the first diamine.
16. The method according to claim 1, wherein the first diamine and the second diamine are different.
17. The method according to claim 1, wherein steps (a) and (b) are performed separately.
18. The method according to claim 1, wherein steps (a) and (b) are performed in situ.
19. The method according to claim 1, wherein the first diamine is selected from the group consisting of diethylene triamine (DETA) or its analogs, N-(3-aminopropyl)-1,3-propanediamine (dipropylene triamine or DPTA), ethylene diamine (EDA), 1,6-hexamethylenediamine (HMDA), triethylene tetraamine (TETA), tetraethylene pentaamine (TEPA), N-methyl-bis(aminopropyl)amine (MBAPA), bis (hexamethylene triamine) (BHMT), tripropylene tetraamine, tetrapropylene pentaamine, spermine, spermidine, 1-phenyl-2,4-pentane diamine, 2-phenyl-1,3-propanediamine, 2-methyl-1,5-pentane diamine, and phenylene diamine and combinations thereof.
20. The method according to claim 1, wherein the acrylate is selected from the group consisting of alkyl acrylates, alkyl methacrylates, aryl acrylate, aryl methacrylates, methyl, ethyl, propyl, isopropyl, butyl, isobutyl, tert-butyl, phenyl, and benzyl esters of acrylic acid, methacrylic acid, ethacrylic acid, and butacrylic acid and combinations thereof.
21. The method according to claim 1, wherein the second diamine is selected from the group consisting of diethylene triamine (DETA) or its analogs, N-(3-aminopropyl)-1,3-propanediamine (dipropylene triamine or DPTA), ethylene diamine (EDA), 1,6-hexamethylenediamine (HMDA), triethylene tetraamine (TETA), tetraethylene pentaamine (TEPA), N-methyl-bis(aminopropyl)amine (MBAPA), bis(hexamethylene triamine) (BHMT), tripropylene tetraamine, tetrapropylene pentaamine, spermine, spermidine, 1-phenyl-2,4-pentane diamine, 2-phenyl-1,3-propanediamine, 2-methyl-1,5-pentane diamine, and phenylene diamine and combinations thereof.

22. The method according to claim 1, wherein the final reaction product is a water-soluble linear condensation polymer.

23. The method according to claim 1, wherein the final reaction product is a water-soluble branched condensation polymer.

24. The method according to claim 1, wherein the intermediate pre-polymer reaction product has the formula comprising:

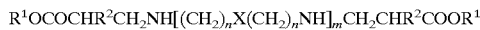

wherein $R^1$ is selected from the group consisting of substituted C1–C6 alkyl group, unsubstituted C1–C6 alkyl group, and hydrogen; R2 is selected from the group consisting of H and C1–C2 alkyl group; X is selected from the group consisting of O, NH, S, $CH_3N$—, alkyl (C1–C6) and aryl; n ranges from 1–10; and m ranges from 1–6.

25. The method according to claim 1, wherein the final reaction product has the formula comprising:

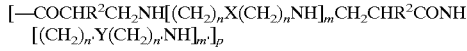

wherein $R^2$ is selected from the group consisting of H and C1–C2 alkyl group; X is selected from the group consisting of O, NH, S, $CH_3N$—, alkyl (C1–C6) and aryl; Y is selected from the group consisting of O, NH, S, $CH_3N$—, alkyl (C1–C6) and aryl; n and n' range from 1–10; m and m' range from 1–6; and p ranges from 1–1000.

26. The polyamide according to claim 25, wherein $R^2$ is selected from the group consisting of H and methyl; X is selected from the group consisting of NH and $CH_3N$—; Y is selected from the group consisting of NH and $CH_3N$; n and n' range from 2–3; m and m' are 1; and p ranges from 10–100.

27. The method according to claim 26, wherein $R^2$ is H; X is NH; Y is NH; n and n' range from 2–3; m and m' are 1; and p ranges from 20–100.

28. The method according to claim 25, wherein the final reaction product has a molecular weight of about 1490 to about 200,000 Daltons.

29. An intermediate pre-polymer reaction product, the formula comprising:

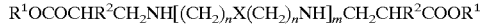

wherein $R^1$ is selected from the group consisting of substituted C1–C6 alkyl group, unsubstituted C1–C6 alkyl group, and hydrogen; $R^2$ is selected from the group consisting of H and C1–C2 alkyl group; X is selected from the group consisting of O, NH, S, $CH_3N$—, alkyl (C1–C6) and aryl; n ranges from 1–10; and m ranges from 1–6.

30. A polyamide polymer, the formula comprising:

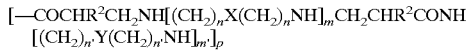

wherein $R^2$ is selected from the group consisting of H and C1–C2 alkyl group; X is selected from the group consisting of O, NH, S, $CH_3N$—, alkyl (C1–C6) and aryl; Y is selected from the group consisting of O, NH, S, $CH_3N$—, alkyl (C1–C6) and aryl; n and n' range from 1–10; m and m' range from 1–6; and p ranges from 1–1000.

31. The polyamide according to claim 30, wherein $R^2$ is selected from the group consisting of H and methyl; X is selected from the group consisting of NH and $CH_3N$—; Y is selected from the group consisting of NH and $CH_3N$; n and n' range from 2–3; m and m' are 1; and p ranges from 10–100.

32. The polyamide according to claim 31, wherein $R^2$ is H; X is NH; Y is NH; n and n' range from 2–3; m and m' are 1; and p ranges from 20–100.

33. A method for making a polyamide resin comprising the steps of:

(a) reacting the final reaction product of claim 30 with an epihalohydrin; and (b) allowing the reaction to proceed where the final reaction product is cross-linked.

34. The method according to claim 33, wherein the epihalohydrin is epichlorohydrin.

35. The method according to claim 33, wherein the final reaction product is cross-linked with itself.

36. The method according to claim 33, wherein the final reaction product is cross-linked with another material.

37. The method according to claim 33, wherein the polyamide resin comprises the formula:

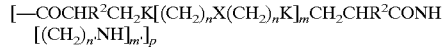

wherein $R^2$ is selected from the group consisting of H and C1–C2 alkyl group; n and n' range from 1–10; m and m' range from 1–6; p ranges from 1–1000;

K is selected from the group consisting of

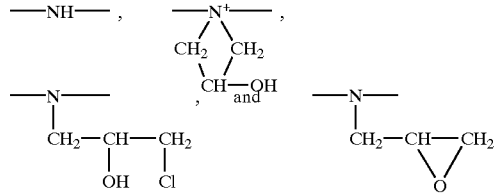

X is selected from the group consisting of O, K, S, Q, alkyl (C1–C6) and aryl; Y is selected from the group consisting of O, K, S, Q, alkyl (C1–C6) and aryl; and Q is selected from the group consisting of

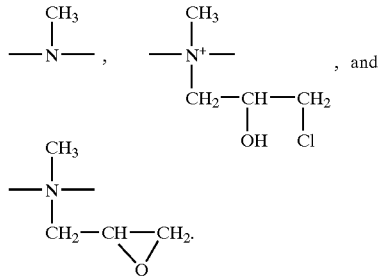

38. A polyamide resin comprising:

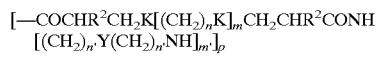

wherein $R^2$ is selected from the group consisting of H and C1–C2 alkyl group; n and n' range from 1–10; m and m' range from 1–6; p ranges from 1–1000;

K is selected from the group consisting of

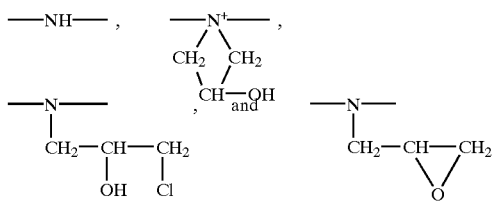

X is selected from the group consisting of O, K, S, Q, alkyl (C1–C6) and aryl; Y is selected from the group consisting of O, K, S, Q, alkyl (C1–C6) and aryl; and Q is selected from the group consisting of

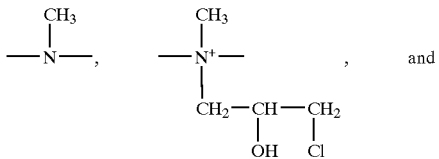

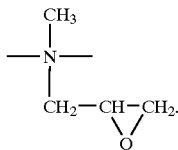

39. A wet strength agent produced by the method of claim 1.

40. A creping aid produced by the method of claim 1.

41. A surface additive for wool produced by the method of claim 1.

42. A cellulosic product comprising the resin of claim 38.

* * * * *